March 25, 1952 M. J. FASANO ET AL 2,590,167
FISHING LURE
Filed Oct. 1, 1946

MICHAEL J. FASANO
ERNEST F. FASANO
INVENTORS

BY Charles Shepard
ATTORNEY

Patented Mar. 25, 1952

2,590,167

UNITED STATES PATENT OFFICE 2,590,167

FISHING LURE

Michael J. Fasano and Ernest F. Fasano,
Rochester, N. Y.

Application October 1, 1946, Serial No. 700,400

7 Claims. (Cl. 43—42.51)

The present invention relates to a fishing appliance in the nature of a lure of the kind drawn through the water in trolling operations or the like, and having hooks upon which the fish are caught.

An object of the invention is the provision of a generally improved and more satisfactory fishing appliance of this kind.

Another object is the provision of a fishing appliance of the above-mentioned nature, so designed and constructed that the hooks may be manually moved from an ineffective protected position to an effective exposed position, so that the appliance may be safely carried in a fisherman's pocket without danger to himself, when the hooks are in their ineffective or protected position, and may be rendered effective when the appliance is to be placed in the water.

Still another object is the provision of an appliance of this nature which is of neat and attractive appearance, of sturdy and inexpensive construction, and of a design such that the shifting of the hooks from effective to ineffective position, and vice versa, may be done easily and quickly.

A further object is the provision of a fishing appliance of this kind in which each hook is provided with a weed guard so designed and constructed that it does not interfere with the shifting movement of the hook from effective to ineffective position, and vice versa.

These and other desirable objects are accomplished by the construction disclosed as an illustrative embodiment of the invention in the following description and in the accompanying drawings forming a part hereof, in which.

The same reference numerals throughout the several views indicate the same parts.

This application is a continuation in part of the United States patent application of Michael J. Fasano and Ernest F. Fasano, Serial No. 668,503, filed May 9, 1946, for Fishing Apparatus.

Figure 1:
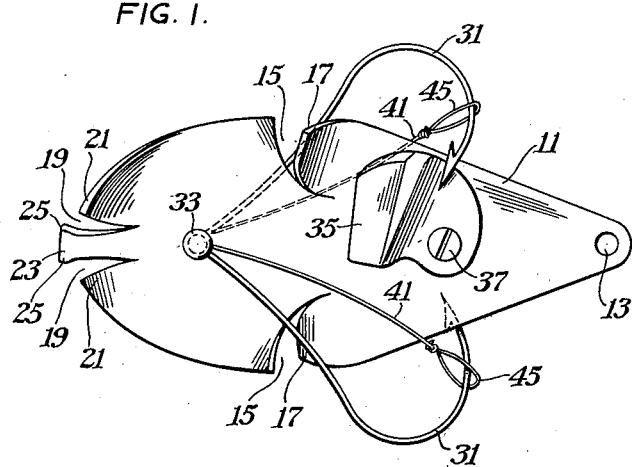
Fig. 1 is a top plan view of an appliance in accordance with a preferred embodiment of the invention, with the hooks in their ineffective or protected position.
Figure 2:
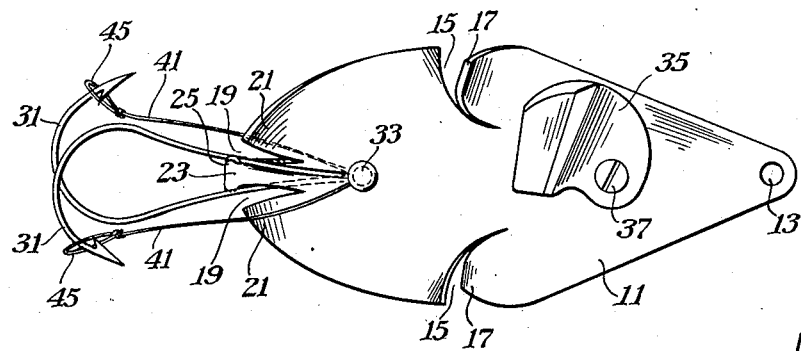
Fig. 2 is a similar view with the hooks in their extended or effective position.

The construction in its preferred form comprises a member to be attached to a fish line and drawn through the water, of the general type sometimes called a spoon, comprising a plate 11 which, when viewed from the direction of Figs. 1 and 2, is of generally pear-shape or tear drop shape. This plate is made of molded plastic material or, preferably, of sheet metal and has a hole 13 at its narrow forward end which is adapted to be connected to the usual swivel fastened to a fish line, a swivel being employed so that the appliance may rotate in the water without twisting the fish line.

Figure 3:
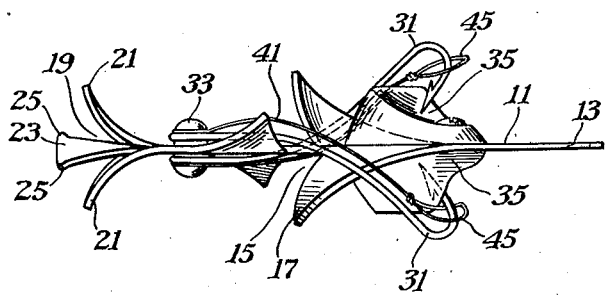
Fig. 3 is a side elevation of the appliance with the parts in the position shown in Fig. 1.

The plate 11 has various portions thereof twisted out of the general plane of the plate which act like vanes or propellors to cause the plate to rotate about its longitudinal axis when it is drawn through the water. For instance, about half way back from the front end to the rear end of the plate, each marginal edge is slitted at 15 so as to form the ear 17, the ear on one edge being bent upwardly and the ear on the opposite edge being bent downwardly. In Fig. 1 the ear on the edge or side which is at the top of the figure is shown as being bent upwardly from the plane of the paper while the ear on the side or edge at the bottom of the figure is shown as being bent downwardly. The material just behind the slit 15 is bent in the opposite direction from the ear 17, as seen in Fig. 3, thus increasing the strength of the rotating force. At the rear or tail end of the plate 11 are two other slits 19 extending approximately longitudinally and symmetrically spaced on opposite sides of the longitudinal center line, forming two ears 21 one of which is bent upwardly and the other of which is bent downwardly, similar to the ears 17. As the appliance is drawn through the water, the reaction of the flow of water on the ears 17 and 21 will cause the entire appliance to rotate about its longitudinal center line, the rotation being in a clockwise direction when viewed from the front or in a counterclockwise direction when viewed from the rear. The material left between the two slits 19 is designated by the numeral 23 and is slightly twisted and somewhat broadened at its rear corners to form protuberances or bumps 25.

Any desired number of fish hooks may be used, two being preferred, both indicated in general by the numeral 31, one hook being on one face of the plate 11 and the other hook on the opposite face, and both having their shanks pivoted on a common pivot 33 extending through the plate 11. Each hook may be freely swung on its pivot 33 in a plane parallel to the general plane of the plate 11, but the pivot is sufficiently tight to resist movement of the hook out of that plane. The swinging of the hook on its pivot carries it from the ineffective position shown in Fig. 1 to the effective position shown in Fig. 2, wherein the shank of the hook is sprung or snapped past the protuberance 25 on the tail 23 of the plate, and the shank of the hook is held resiliently between the protuberance 25 on one side and the edge of the ear 21 on the other side, so as to hold the hook firmly in a stationary position relative to the plate. However, by exerting sufficient force by use of one's fingers, each hook may be snapped over the corner of the protuberance 25 and swung to its ineffective position. The top hook (that is, the hook on the upper side of the plate 11 when viewed as in Figs. 1 and 2) swings in a counterclockwise direction from its effective position to its ineffective position, while the bottom hook swings in a clockwise direction.

Figure 4:
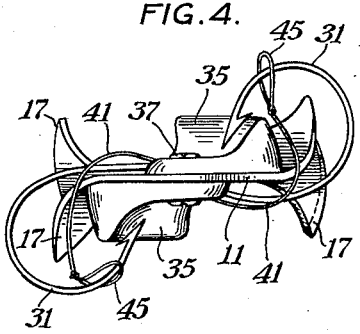
Fig. 4 is a front elevation of the appliance with the parts in the position shown in Figs. 1 and 3.

Considerng the top hook for purposes of illustration, the hook, as above stated, is snapped over the protuberance 25 and then swung in a counterclockwise direction through approximately 90°. Then the barbed end of the hook is forcibly depressed by the fingers so as to twist the shank of the hook and carry the barbed end downward from a plane above the plate 11 to a plane below the plate 11, and then the counterclockwise swinging movement of the hook is continued while the sharp barbed end is held below the plane of the plate 11, so that the sharp end of the hook passes under the plate, and the swinging movement is stopped when the sharp end comes to rest on a member 35 of molded plastic material or some other material softer than the metal of the hook. Two of these members 35 are provided, one on the bottom and the other on top of the plate, as seen in Figs. 3 and 4, and are held to the plate 11 by rivets or screws 37. These plastic members 35 form pads on which the sharp points of the hooks may rest when the hooks are in their ineffective position, so as not to scratch the plate 11, and also, since the plastic pads are softer than the points of the metal hooks, the use of these pads avoids damaging the sharp points of the hooks as would be done if the points rested on a harder substance. It will be understood that in order to get the points of the hooks onto the pads 35, considerable force must be used to twist or displace the hooks against the natural resiliency or springiness thereof, and so when one lets go of a hook after placing the point thereof on the pad, the resiliency of the hook presses the point of the hook very tightly against the pad and in this way keeps the hook frictionally engaged with the pad until a substantial amount of force is used to displace the hook and shift it back in a reverse direction to its effective position.

The swinging of the bottom hook from effective position to ineffective position is exactly the same as the swinging of the top hook above described. If the plate 11 be turned over, the hook that was the bottom hook now becomes the top hook, of course, and is a twin duplicate of the other hook. Both hooks are swung from their ineffective positions to their effective positions by a reverse procedure.

Each hook is preferably provided with a weed guard, so designed and constructed as not to interfere with the movements of the hooks. Each weed guard preferably comprises a slender resilient wire 41 pivoted on the same pivot 33 on which its hook is pivoted, or fixed to the shank of the hook near the pivot, and having a small loop 45 embracing the hook relatively close to the point and barb thereof.

The top hook, when viewed as in Fig. 2, has a shank which extends approximately straight rearwardly, then curves in a counterclockwise direction as seen in Fig. 2, and this curved part of the hook at the same time rises upwardly out of the plane of the paper in Fig. 2 and toward the eye of the observer, the curved portion being, in effect, somewhat spiral or helical. The weed guard of this hook rises from the pivot 33 upwardly at a sharp angle and gradually curves to a horizontal position and then downwardly toward the barbed end of the hook. When the hook is swung to its ineffective position, the curved portion of the hook must be twisted around far enough so that instead of rising up from the plane of the paper in Fig. 2, the pointed end is deflected downwardly below the plane of the paper, in order to slide under the plate 11 and make proper contact with the pad 35 on the bottom of the plate. The loop 45 on the weed guard 41 permits the weed guard to remain in proper relation to the hook in spite of this substantial twisting of the hook, and when the hook is in its ineffective position the weed guard extends around the lateral edge of the plate 11, as seen in Fig. 4.

The spiral or helical shape of the curved part of the hook results in the sharp end of the hook being pointed in the direction of travel of the device through the water. It will be remembered that the ears or fins 17 and 21 are so shaped as to cause the device to rotate as it is drawn through the water, and this rotation will be in such a direction that it tends to drive the points of the hooks into, rather than away from, any object lying in the path of the hooks. Thus a fish is very easily impaled on the hooks and is well and firmly caught thereby.

If desired, the pads 35 may also be shaped so as to assist in producing the rotary movement of the device in the water. Each pad 35 has a relatively low part on which the point of the hook rests when the hook is in its ineffective position, and rearwardly of this low part the pad flares upwardly to a thicker part or ridge, as well seen in Figs. 3 and 4, the upward flare or curve of the pad being principally on one side of the center line of the plate 11 rather than being symmetrically arranged on both sides. The reaction of the water against the upward flaring part of the pad 35, as the device is drawn longitudinally through the water, will tend to cause the device to rotate about its longitudinal axis, thus assisting the rotation caused also by the parts 17 and 21.

When the sharp points of the hooks are resting on the pads 35, the device is perfectly safe to handle and may be carried in one's pocket without danger of injury to one's person or to the clothing. Yet it is but the work of a moment, upon arriving at the scene of the fishing, to swing the hooks to their effective positions.

It is seen from the foregoing disclosure that the above-mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A fishing appliance comprising a plate-like member adapted to be drawn in a direction longitudinally thereof through the water during a fishing operation, and a resilient fish hook pivotally mounted on one face of said member and normally extending rearwardly to an exposed operative position at the rear of said member for use in catching fish, said hook being capable of being swung forwardly from said exposed position and being deflected in a direction transverse to said member and to the direction of travel so that the sharp end of the hook will lie in a non-operative protected position on the opposite face of said member from the face to which said hook is pivoted.

2. A construction as described in claim 1, in which said opposite face of said member is provided with a pad of material softer than said fish hook for receiving the pointed end of the hook.

3. A fishing appliance including a plate-like member having a longitudinally extending flat central portion adapted to be drawn through the water, a pair of hooks having shanks including substantially straight portions and curved portions terminating in sharp points, the substantially straight portions of said shanks of said hooks being pivotally mounted on opposite surfaces of said member for swinging movement relative to said member in a plane approximately parallel to the plane of the central portion of said member, and protuberances near the rear end of said member over which the shanks of said hooks may be sprung to hold the shanks resiliently in an effective rearwardly-extending position, each hook being adapted to be swung forwardly from said position and to have the curved portion and point thereof twisted to an ineffective position in which the point lies on the opposite face of said member from the face on which the straight portion of the shank is pivoted and points toward said opposite face in close proximity thereto.

4. A construction as described in claim 3, further including two pads on opposite faces of said member in position so that said sharp ends of said hooks may rest on said pads when said hooks are swung forwardly and twisted as described.

5. A fishing appliance including a plate-like member adapted to be drawn longitudinally through the water, said member having portions shaped to react against the pressure of the water to cause said member to rotate about its longitudinal axis while it is being drawn through the water, a fish hook mounted on one face of said member and having a forward portion curved spirally and terminating in a pointed end which projects in the direction of rotation of said member when said fish hook is in its normal effective position, said fish hook being pivotally mounted on said member for swinging on its pivot and for resilient twisting movement from said normal effective position to an ineffective position in which said pointed end of said hook lies on the opposite face of said member from the face on which said hook is pivotally mounted, the resilience of said fish hook tending to keep said pointed end tightly engaged with said opposite face.

6. A construction as described in claim 5, further including a pad mounted on said opposite face of said member to form a bearing surface on which said pointed end of said hook may rest when said hook is in its ineffective position.

7. A construction as described in claim 5, further including a pad mounted on said opposite face of said member to form a bearing surface on which said pointed end of said hook may rest when said hook is in its ineffective position, said pad being shaped to react with the water to tend to rotate said member about its longitudinal axis as it is drawn through the water.

MICHAEL J. FASANO.
ERNEST F. FASANO.

REFERENCES CITED

The following references are of record in the file of this patent:

UNITED STATES PATENTS

| Number | Name | Date |
|---|---|---|
| 861,116 | Heddon | July 23, 1907 |
| 1,197,820 | Guise | Sept. 12, 1916 |
| 1,290,571 | Kawasaki | Jan. 5, 1919 |
| 1,629,510 | Klipec | May 24, 1927 |
| 2,002,117 | Lavitt | May 21, 1935 |
| 2,168,476 | Hartung | Aug. 8, 1939 |
| 2,180,918 | Verzi | Nov. 21, 1939 |
| 2,395,641 | Peterson | Feb. 26, 1946 |

FOREIGN PATENTS

| Number | Country | Date |
|---|---|---|
| 309,127 | Great Britain | Nov. 21, 1929 |